(12) United States Patent
Hunter et al.

(10) Patent No.: US 7,046,420 B1
(45) Date of Patent: May 16, 2006

(54) MEM MICRO-STRUCTURES AND METHODS OF MAKING THE SAME

(75) Inventors: James Hunter, Campbell, CA (US); Christopher Gudeman, Los Gatos, CA (US); Alexander Payne, Benlomond, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 10/377,680

(22) Filed: Feb. 28, 2003

(51) Int. Cl.
*G02B 26/00* (2006.01)

(52) U.S. Cl. ............ 359/291; 359/223; 359/290; 359/572

(58) Field of Classification Search ............ 359/237, 359/247, 254, 263, 290, 291, 302, 117, 114, 359/197, 212, 223, 543, 578, 847, 849, 572
See application file for complete search history.

(56) References Cited

U.S. PATENT DOCUMENTS

| | | | |
|---|---|---|---|
| RE16,767 E | 10/1927 | Jenkins | |
| RE25,169 E | 5/1962 | Glenn | |
| 4,257,053 A | 3/1981 | Gilbreath | 347/261 |
| 4,561,011 A | 12/1985 | Kohara et al. | 257/713 |
| 5,031,144 A | 7/1991 | Persky | 365/145 |
| 5,061,049 A * | 10/1991 | Hornbeck | 359/224 |
| 5,185,823 A | 2/1993 | Kaku et al. | 385/2 |
| D334,557 S | 4/1993 | Hunter et al. | D14/114 |
| D334,742 S | 4/1993 | Hunter et al. | D14/113 |
| 5,206,829 A | 4/1993 | Thakoor et al. | 365/117 |
| 5,216,278 A | 6/1993 | Lin et al. | 257/688 |
| D337,320 S | 7/1993 | Hunter et al. | D14/113 |
| 5,229,597 A | 7/1993 | Fukatsu | |
| 5,315,429 A | 5/1994 | Abramov | |
| 5,320,709 A | 6/1994 | Bowden et al. | 438/745 |
| 5,370,766 A * | 12/1994 | Desaigoudar et al. | 216/13 |
| 5,552,635 A | 9/1996 | Kim et al. | 257/706 |
| 5,832,148 A | 11/1998 | Yariv | 385/16 |
| 5,835,255 A * | 11/1998 | Miles | 359/291 |
| 5,841,929 A | 11/1998 | Komatsu et al. | 385/129 |
| 5,844,711 A | 12/1998 | Long, Jr. | 359/291 |
| 6,012,336 A | 1/2000 | Eaton et al. | 73/754 |
| 6,096,656 A | 8/2000 | Matzke et al. | 438/702 |
| 6,154,305 A | 11/2000 | Dickensheets et al. | |

(Continued)

FOREIGN PATENT DOCUMENTS

DE      32 33 195 A1      3/1983

(Continued)

OTHER PUBLICATIONS

R. Apte, "Grating Light Valves for High Resolution Displays", Solid State Sensors and Actuators Workshop, Ph.D. Dissertation, Stanford University (Jun. 1994).

(Continued)

*Primary Examiner*—Hung Xuan Dang
*Assistant Examiner*—Joseph Martinez
(74) *Attorney, Agent, or Firm*—Okamoto & Benedicto LLP

(57) ABSTRACT

A device comprising an array of free metal ribbons that are coupled to a substrate through ceramic support structures is disclosed. The device is preferably an optical MEM device, wherein a first set of free metal ribbons are configured to move relative to a second set of alternating free metal ribbons for modulating an incident light source. An optical MEM system in accordance with the invention includes a light source and suitable optics for transmitting light to and from the array of free metal ribbons. The optical MEM device exhibits reduced surface charging and has applications in optical communications.

14 Claims, 11 Drawing Sheets

U.S. PATENT DOCUMENTS

| | | | |
|---|---|---|---|
| 6,249,381 B1 | 6/2001 | Suganuma | 359/618 |
| 6,282,213 B1 | 8/2001 | Gutin et al. | 372/20 |
| 6,313,901 B1 | 11/2001 | Cacharelis | 349/187 |
| 6,327,071 B1 * | 12/2001 | Kimura | 359/291 |
| 6,346,430 B1 | 2/2002 | Raj et al. | 438/64 |
| 6,351,329 B1 * | 2/2002 | Greywall | 359/290 |
| 6,418,152 B1 | 7/2002 | Davis | 372/18 |
| 6,438,954 B1 | 8/2002 | Goetz et al. | |
| 6,445,502 B1 * | 9/2002 | Islam et al. | 359/571 |
| 6,479,811 B1 | 11/2002 | Kruschwitz et al. | 250/237 G |
| 6,569,717 B1 | 5/2003 | Murade | 438/149 |
| 6,712,480 B1 * | 3/2004 | Leung et al. | 359/846 |
| 2002/0135708 A1 | 9/2002 | Murden et al. | 349/19 |
| 2002/0176151 A1 | 11/2002 | Moon et al. | 359/298 |
| 2003/0056078 A1 | 3/2003 | Johansson et al. | 711/200 |

FOREIGN PATENT DOCUMENTS

| | | |
|---|---|---|
| DE | 43 23 799 A1 | 1/1994 |
| DE | 197 23 618 A1 | 12/1997 |
| DE | 197 51 716 A1 | 5/1998 |
| DE | 198 46 532 C1 | 5/2000 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 492 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-111151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 02/065184 A3 | 8/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/073286 A2 | 9/2002 |
| WO | WO 02/084375 A1 | 10/2002 |
| WO | WO 02/084397 A3 | 10/2002 |
| WO | WO 03/001281 A1 | 1/2003 |
| WO | WO 03/001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

O. Solgaard, "Integrated Semiconductor Light Modulators for Fiber-Optic and Display Applications", Ph.D. Dissertation, Stanford University Feb., 1992.

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69-78.

R. Gerhard-Multhaupt, "Light-Valve Technologies for High-Definition Television Projection Displays", Displays vol. 12, No. 3/4 (1991), pp. 115-128.

O. Solgaard, F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformable Grating Valve for High Resolution Displays," The 7th International Conference on Solid-State Sensors and Actuators.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Farn et al., "Color Separation by use of Binary Optics," Optics Letters, vol. 18:15 pp. 1214-1216, 1993.

P. Alveda, "VLSI Microdisplays and Optoelectric Technology," MIT, pp. 1-93, 1995.

P. Alvelda, "VLSI Microdisplay Technology," Oct. 14, 1994.

D. Rowe, "Laser Beam Scanning," SPIE, vol. 2088, Oct. 5, 1993, 18-26.

L. Hornbeck, "Deformable-Mirror Spatial Light Modulators," Spatial Light Modulators and Applications III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269, 1997.

Buhler et al., "Linear Array of Complementary Metal Oxide Semiconductor Double-Pass Metal Micromirrors," Optical Engineering, vol. 36, No. 5, pp. 1391-1398, May 1997.

Gani et al., "Variable Gratings for Optical Switching: Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

Burns, D.M. et al., *Development of microelectromechanical variable blaze gratings*, Sensors and Actuators A, pp. 7-15, 1998.

R.N. Thomas, et al., "The Mirror-Matrix Tube: A Novel Light Valve for Projection Displays", IEEE Transactions on Electron Devices, vol. ED-22, No. 9, pp. 765-775, Sep. 1975.

J. Goldberg, et al., "An Aluminum/SiO2/Silicon-on-Sapphire Light Valve Matrix for Projection Displays," Applied Physics Letters, vol. 26, No. 7, pp. 391-393, Apr. 1975.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonics Technology Letters, vol. 9, No. 3, Mar. 1997, pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13-16, 1994.

Sene et al., "Polysilicon micromechanical gratings for optical modulation," Sensors and Actuators, vol. A57, pp. 145-151, 1996.

Amm et al., "Invited Paper Grating Light Valve™ Technology: Update and Novel Applications," SID Digest, vol. 29, 1998.

Development of Digital MEMS-Based Display Technology Promises Improved Resolution, Contrast, and Speed, XP-000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", p. 103-115.

Olga B. Spahn, et al., "High Optical Power Handling of Pop-Up Microelectromechanical Mirrors", Sandia National Laboratories, IEEE 2000, p. 51-52.

David M. Burns, et al. "Optical Power Induced Damage to Microelectromechanical Mirrors", Sensors and Actuators A 70, 1998, p. 6-14.

V.S. Aliev et al., "Development of Si(100) surface roughness at the initial stage of etching in F2 and XeF2 gases; ellipsometric study," Surface Science 442 (1999), pp. 206-214.

Xuan-Qi Wang et al., "Gas-Phase Silicon Etching with Bromine Trifluoride," Depart. of Electrical Engineering, 136-93 California Institute of Technology, 1997 IEEE, pp. 1505-1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.

F.A. Houle, "Dynamics of SiF4 description during etching of silicon by XeF2," J. Chem. Phys. 87 (3), Aug. 1, 1987, pp. 1866-1872.

Mehran Mehregany, "Microelectromechanical Systems," 1993 IEEE, pp. 14-22.

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commercial CMOS Fabricated Integrated Dynamic Thermal Scene Simulator," 1991 IEEE, pp. 29.4.1-29.4.4.

M. Parameswaran et al., "CMOS Electrothermal Microactuators," Depart. of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M. Vugts et al., "Si/XeF2 etching: Temperature dependence," 1996 American Vacuum Society, pp. 2766-2774.

P. Krummenacher et al., "Smart Temperature Sensor in CMOS Technology," Sensors and Actuators, A-21—A-23 (1990), pp. 636-638.

Henry Baltes, "CMOS as sensor technology," Sensors and Actuators A, 37-38, (1993), pp. 51-56.

Thomas Boltshauser et al., "Piezoresistive Membrane Hygrometers Based on IC Technology," Sensor and Materials, 5, 3, (1993), pp. 125-134.

Z. Parpia et al., "Modelling of CMOS Compatible High Voltage Device Structures," pp. 41-50.

Jon Gildemeister, "Xenon Difluoride Etching System," 1997 UC Berkeley MicroTabrication Manual Chapter 7.15, p. 2-5.

W. Riethmuller et al., "A smart accelerometer with on-chip electronics fabricated by a commercial CMOS process," Sensors and Actuators A. 31, (1992), 121-124.

W. Gopel et al., "Sensors- A Comprehensive Survey," vol. 7, Weinheim New York, 44 pgs.

D. E. Ibbotson et al., "Comparison of XeF2 and F-atom reations with Si and SiO2," 1984 American Institute of Physics, pp. 1129-1131.

D. E. Ibbotson et al., "Plasmaless dry etching of silicon with fluorine-containing compounds," 1984 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching.," Solid State Technology, V. 26, #4, Apr. 1983, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech. Zurich, Switzerland, 195 pgs.

E. Hecht, "Optics", Addison-Wesley, $2^{nd}$ edition, 1987, Adelphi University, pp. 163-169.

E. Hecht, "Optics", Addison-Wesley, $2^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P.C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.ti/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Mircomirror Devices™", Tribology Letters, No. 3, pp. 239-247, 1997.

K. W. Goossen et al., "Silicon Modulator Based on Mechanically-Acitve Anti-Reflection Layer with 1 Mbit/sec Capability for Fiber-in-the-Loop Applications", IEEE Protonics Technology Letters, vol. 6, No. 9, Sep. 1994. pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in $Al/Si_3N_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 Digest, XP 2020715, pp. 931-933.

* cited by examiner

MEM MICRO-STRUCTURES AND METHODS OF MAKING THE SAME

FIELD OF THE INVENTION

The invention relates to micro-structures. More particularly, the present invention relates to free metal micro-structures in micro-electro mechanical machines.

BACKGROUND OF THE INVENTION

Optical MEM devices are used to modulate one or more wavelengths of light. Optical MEM devices can have applications in display, print and electrical device technologies. Examples of optical MEM devices which utilize suspended micro-ribbon structures to modulate light are disclosed in the U.S. Pat. Nos. 5,311,360, 5,841,579 and 5,808,797, all issued to Bloom et al., the contents of which are hereby incorporated by reference.

Briefly, an optical MEM device described in the above referenced patents has one or more sets of movable ribbons that comprise a support layer and a reflective top-layer. The support layer is preferably a silicon nitride layer and the reflective top-layer is preferably an aluminum layer. The ribbon structures are typically secured to a substrate through opposite ends of the ribbon, whereby center portions of the ribbons, referred to herein as the active portions, move up and down to modulate an incident light source.

Optical MEM devices described previously have relied on dielectric support layers, such as layers of silicon-nitride, with conductive and reflective top-layers, such as aluminum. Because the sides and the undersides of the ribbon are dielectric surfaces, there is a propensity for such ribbon structures to experience charging problems during operation.

Charging refers to the undesirable collection and migration of electrical charges on the insulating surfaces, or dielectric surfaces, of a MEM device. The presence of surface charging on the ribbons of an optical MEM device can perturb or shift the switching bias voltages required to operate the device causing the device to generate unreliable or irreproducible optical signals.

Currently, there is no known optical MEM device construction or method of making an optical MEM device with ribbon structures which can efficiently drain charge from the ribbon surfaces in a reliable manner. Accordingly, what is desired is an optical MEM device with reduced charging characteristics and a method for making the same.

SUMMARY OF THE INVENTION

To help ensure that charging is minimized in an optical MEM device, the dielectric surfaces of the ribbons can be passivated. However, while surface passsivation can reduce charging, typically surface passsivation does not eliminate charging. As a second approach, the dielectric surfaces of the ribbons can be completely covered with a metal. In practice, however, this is not possible because the ribbons are typically formed in a layering process, whereby dielectric materials are deposited over a sacrificial material to define the composition of the ribbons. The dielectric layer is then cut into ribbons and the sacrificial material is etched away to release the ribbons. Accordingly, to make ribbons that are covered, or mostly covered with metal, either a metal layer must be deposited before the deposition of the dielectric materials or, alternatively, the metal layer must be deposited on the surfaces of the ribbons after they are formed; both methods propose considerable challenges. Firstly, many metals that are suitable for optical applications, such as aluminum, can not withstand the high processing temperatures required to deposit the dielectric materials. Accordingly, aluminum and other metals can not be used in a layering process. Secondly, after the ribbons are formed, attempts to deposit metal on the ribbon surfaces can lead to sticking between ribbons, rendering the device inoperative. To address the aforementioned problems, the invention is direct to an optical MEM devices with free metal ribbons, which minimizes charging and which, preferably, do not require additional processing steps to fabricate.

In accordance with the embodiments of the invention, a device comprises metal micro-structures suspended over a substrate through at least two securing regions. The device is preferably an optical MEM device with an array of metal ribbons configured to modulate an incident light source, wherein a first set of metal ribbons are configured to move relative to a second set of the metal ribbons. The metal ribbons can be formed from a number of metals and metal alloys, but are preferably formed from aluminum. The ribbons preferably have lengths in a range of about 50 to about 500 microns and widths in a range of about 4.0 to about 40 microns.

The metal ribbons are preferably coupled to the substrate in the securing regions through a plurality of ceramic support structures, which are post and anchor features positioned at, or near, ends of each of the metal ribbons. Anchor features generally refer to larger support features positioned most exterior along a ribbon and near, or at, the ends of the ribbon. Post features generally refer to smaller support features that are interior along the ribbon with respect to the anchor features but are still nears the ends of the ribbon. Both anchor and post features provide support for the ribbon, with the formation of post features allowing for the ability to fine tune the physical properties of the ribbon during the manufacturing process. Further details of anchor and post features and methods for making the same are described in U.S. patent application Ser. No. 10/186,911, filed Jun. 28, 2002 and entitled "MICRO-SUPPORT STRUCTURES", the contents of which are hereby incorporated by reference.

The substrate is any suitable substrate, but is preferably a silicon wafer comprising a oxide layer, such as silicon dioxide, wherein ceramic support structures are coupled to the silicon substrate through the oxide layer.

An optical MEM device, in accordance with embodiments of the invention, comprises a light source to irradiate the array of metal ribbons and a means to transmit light to and from the array of metal ribbons. The light source and/or the means to transmit light preferably comprise one or more optical fibers and/or other suitable optics for the application at hand.

In accordance with the method of the invention, a micro-device is formed by depositing a sacrificial support layer onto a suitable substrate. The ceramic support features, that couple to the substrate are formed through the sacrificail support layer. A metal layer is deposited over the ceramic support features and the sacrificial support layer. The metal layer is cut into ribbons and the sacrificial support layer is etched to release the ribbons.

DETAILED DESCRIPTION OF THE EMBODIMENTS

Figure 1A:
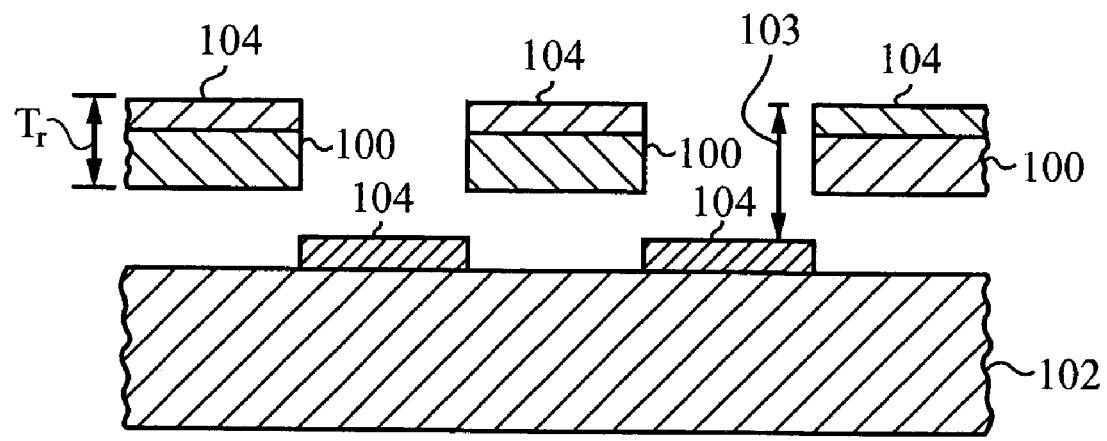
FIGS. 1a–b are cross-sectional representations of a micro-structure comprising a plurality of moveable ribbon structures, in accordance with the instant invention.

Referring to FIG. 1*a*, an optical MEM device can have a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective material, such as silver or aluminum on the substrate 102 and the ribbons 100. The ribbons and the substrate structure are fabricated from silicon-based materials. A height difference 103 between the reflective surfaces 104 of the substrate 102 and the reflective surfaces 104 of the ribbons 100 are configured to be $\lambda/2$ when the ribbons 100 are in an up position as shown in FIG. 1*a*. When light having a wavelength $\lambda$ impinges on the compliment of reflective surfaces 104, light that is reflected from the surfaces 104 of the substrate 102 and ribbons 100 will be in phase. Light which strikes the reflective surfaces 104 of the substrate 102 travels $\lambda/2$ further than the light striking the reflective surfaces 104 of the ribbons 100. Then the portion of light that is reflected back from the reflective surfaces 104 of the substrate 102 returns traveling an addition $\lambda/2$ for a total of one complete wavelength $\lambda$. Therefore, the compliment of the reflective surfaces 104 function as a mirror to the incident light source with a wavelength $\lambda$.

Figure 1B:
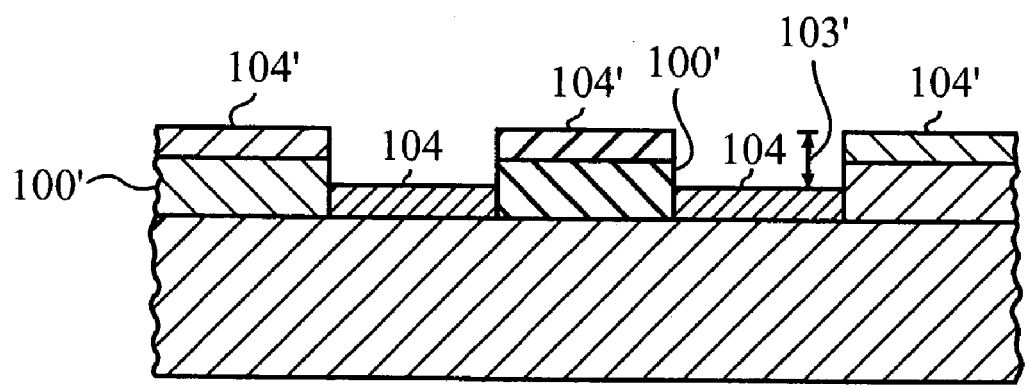

By applying an appropriate bias voltages across the ribbons 100 and the substrate 102, a portion of the ribbons 100 move towards and contacts the substrate 102, as shown in FIG. 1*b*. A thickness $T_r$ of the ribbons 100 is designed to be $\lambda/4$ such that a distance 103' is also $\lambda/4$. When light having a wavelength $\lambda$ impinges on surfaces 104 and 104' with the ribbons 100 in the down position, as shown in FIG. 1*b*, the portion of light reflected from the surfaces 104' of the ribbons 100 will be out of phase with the portion of light reflected from the surfaces 104 of the substrate 102, thereby generating the conditions for destructive interference. By alternating the ribbons between the positions for constructive interference, as shown in FIG. 1*a*, and the positions for destructive interference, as shown in FIG. 1*b*, the optical MEM device is capable of modulating the intensity of reflected light from an impinging light source having a wavelength $\lambda$.

Figure 2A:
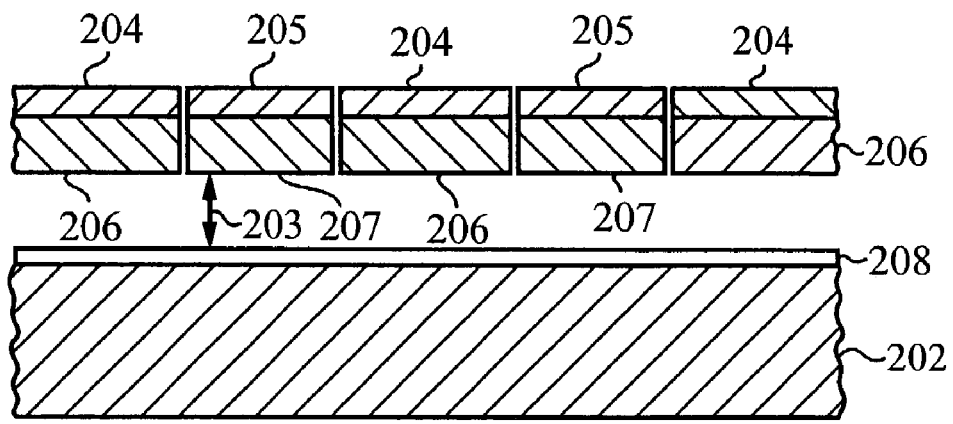
FIGS. 2*a–b* are cross-sectional representations of a microstructure comprising two sets of ribbon structures, in accordance with the instant invention.
Figure 2B:
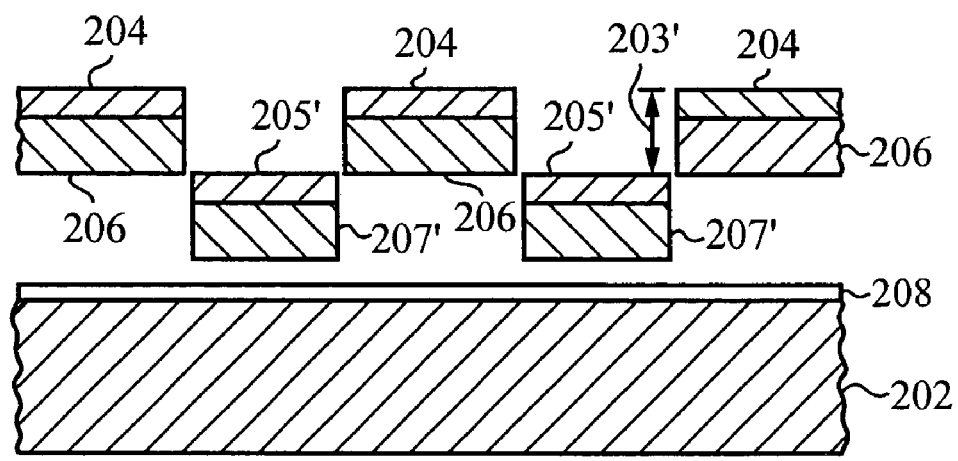

FIGS. 2*a–b* illustrate cross sectional views of alternative optical MEM device construction. In accordance with this construction, the optical MEM device has at least two sets of alternating ribbons 206 and 207 that are approximately in the same reflective plane. Referring to FIG. 2*a*, the ribbons 206 and 207 are suspended over a substrates structure 202 by a distance 203. The ribbons 206 and 207 are provided with reflective surfaces 204 and 205, respectively. Preferably, the surface of the substrate 202, or a portion thereof, also includes a reflective surface 208. The reflective surface of the substrate 208 and the reflective surfaces of the ribbons 204 and 205 are preferably configured to be separated by a distance approximately equal to a multiple of $\lambda/2$ of the impinging light source. Thus, the portion of light that is reflected from the compliment of surfaces 204, 205 and 208 are all in phase and constructively interfere, thereby the maximum intensity is observed. In operation, the flat diffraction optical MEM device alternates between the conditions for constructive and destructive interference by moving the first set of ribbons 206 or the second set of ribbons 207 relative to each other by a distance corresponding $\lambda/4$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate to generate Coulombic attractions between the active ribbons and the substrate.

Now referring to FIG. 2*b*, when a sufficient bias voltage is applied across the active ribbons 207 and the substrate 202, the ribbons 207 are displaced relative to the bias ribbons 206 by a distance 203' that is approximately equal to a multiple of $\lambda/4$. Accordingly, the portions of light that are reflected from the surfaces 205' of the active ribbons 207' will destructively interfere with the portion of light that are reflected from the surfaces 204 of the bias ribbons 206. It will be clear to one skilled in the art that an optical MEM device may be configured to modulate an incident light source with a wavelength $\lambda$ in other operative modes. For example, both sets of ribbons 206 and 207 may be configured to move and separate by multiples of $\lambda/4$ in order to alternate between the conditions for constrictive and destructive interference.

Figure 3A:
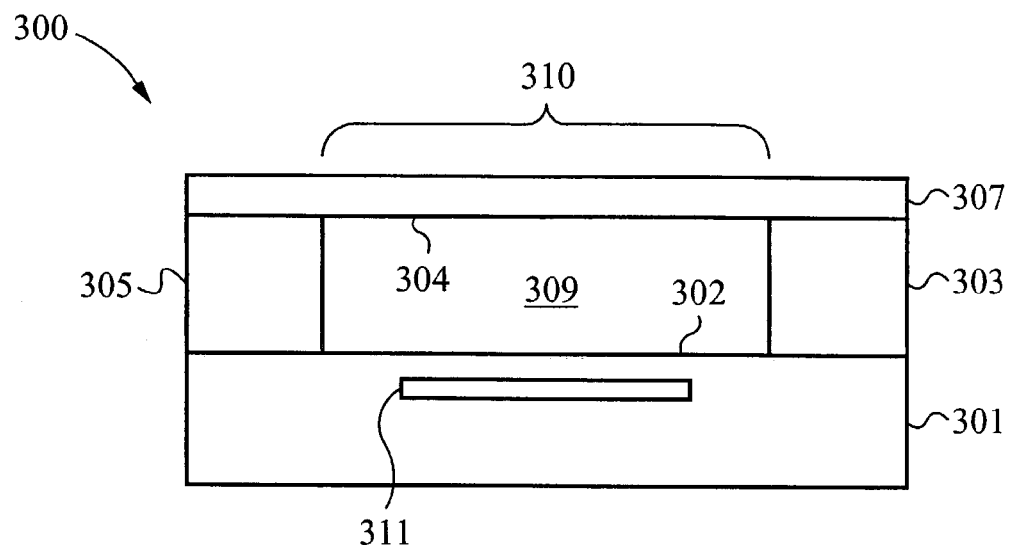
FIG. 3*a* is a cross-sectional representation of a microdevice having a metal ribbon structure supported through ceramic supports, in accordance with the instant invention.

The ribbons of the MEM devices, described in FIGS. 1*a–b* and FIGS. 2*a–b* are preferably hermetically sealed within a die structure. Methods and materials used for providing a hermetically sealed die are described in the U.S. patent application Ser. No. 09/124,710, filed Jul. 29, 2001, entitled "METHOD OF AND APPARATUS FOR SEALING AN HERMETIC LID TO A SEMI CONDUCTOR DIE", now U.S. Pat. No. 6,303,986, the contents of which are hereby incorporated by reference. Embodiments of the invention are preferably directed to an optical MEM device, system and method utilizing one or more arrays of movable ribbons structures to modulate light, such as described above. However, in accordance with the embodiments of the invention, the ribbons are free metal ribbons, wherein the active region of the ribbons are substantially metal, as described below FIG. 3a shows a cross-sectional view of micro-structure 300 with a suspended metal structure 307, in accordance with the embodiments of the invention. The micro-structure 300 comprises a substrate 301 that is preferably formed from a silicon-based material, such as silicon, doped silicon, silicon dioxide, silicon nitride and/or combinations thereof. The metal structure 307, is suspended over the substrate 301 at two or more positions through ceramic support features 303 and 305, wherein the bottom surface 304 of the metal structure 307 and the top surface 302 of the substrate 301 form a gap 309. In use, a bias voltage is applied across the metal structure 307 and a substrate electrode 311 causing an active portion 310 of the metal structure 307 to move towards the substrate 301. The metal structure 307 is preferably a metal ribbon structure having a thickness in a range of about 300 to about 3000 Angstroms, a length in a range of about 50 to about 500 microns and a width in a range of about 4.0 to about 40 microns. Also, the micro-structure 300 preferably comprises an array of ribbon structures (not shown) wherein ribbon pairs are configured to modulate light having a wavelength in a range of about 300 to about 3000 nanometers, as described above.

Still referring to FIG. 3a, the support structures 303 and 305 are formed from any number of ceramic materials, but preferably comprise silicon nitride. The support structures 303 and 305, in accordance with the embodiments of the invention, also comprise one or more layers of silicon, silicon dioxide and metal, as described below. Further, while two support structures 303 and 305 are shown in FIG. 3a, any number of support structure for supporting the metal structure 307 is considered to be within the scope of the invention.

Figure 3B:
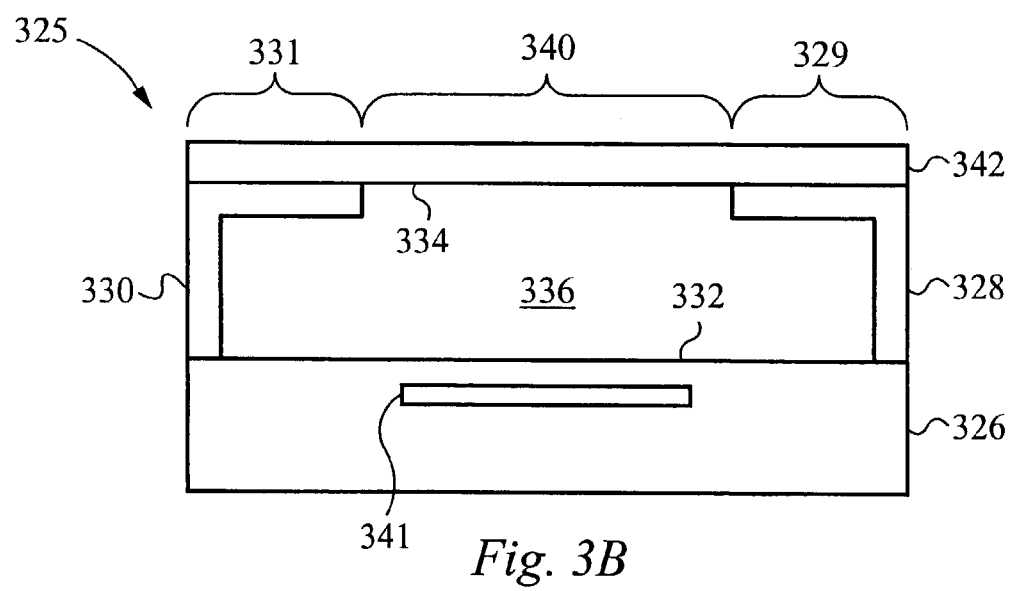
FIG. 3*b* is a cross-sectional representation of a microdevice having a metal ribbon structure supported through extended ceramic support structures, in accordance with the instant invention.

FIG. 3b shows a cross-sectional view of micro-structure 325 with a suspended metal structure 342, in accordance with further embodiments of the invention. The micro-structure 325 comprises a substrate 326 that is preferably formed from a silicon-based material, such as silicon, doped silicon, silicon dioxide, silicon nitride and/or combinations thereof. The metal structure 342 is suspended over the substrate 326 at two or more positions through extended ceramic support features 328 and 330 with extended support portions 329 and 331, respectively. A bottom surface 334 of the metal structure 342 and a top surface 332 of the substrate 326 form a gap 336. In use, a bias voltage is applied across the metal structure 342 and a substrate electrode 341 causing an active portion 340 of the metal structure 342 to move towards the substrate 326.

Still referring to FIG. 3b, the extended support features 328 and 330 are formed from any number of ceramic materials, but preferably comprise silicon nitride. The support features 328 and 330, in accordance with the embodiments of the invention, also comprise one or more layers of silicon, silicon dioxide and metal, as described below. Further, while two support structures 328 and 330 are shown in FIG. 3b, any number of support features for supporting the metal structure 342 is considered to be within the scope of the invention.

Figure 4A:
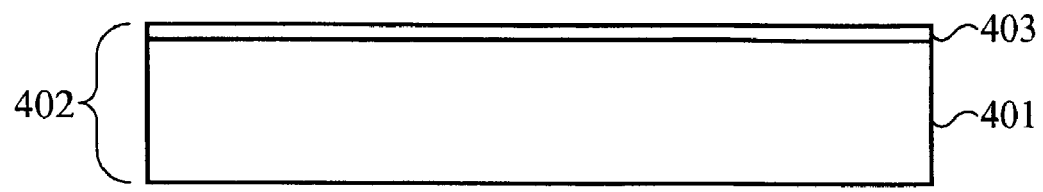
FIGS. 4*a–f* illustrate making a device with a metal ribbon, in accordance with the embodiments of the invention.
Figure 4B:
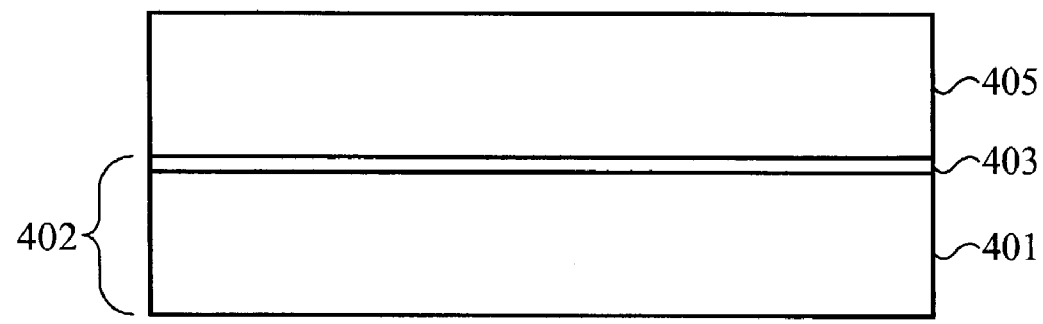

FIGS. 4a–f illustrate steps for making a micro-device comprising a metal ribbon structure coupled to a substrate, in accordance with the embodiments of the invention. Referring to FIG. 4a, a substrate 402 comprising an etch stop layer 403, that is preferably a silicon dioxide layer formed over a silicon or a poly-silicon layer 401, is utilized to deposit subsequent layers. The substrate 402 can comprise any number of layers, including, but not limited to metal layers, nitride layers, and doped silicon layers (not shown). On top of the etch stop layer 403, a sacrificial layer 405 is deposited, as shown in FIG. 4b. The sacrificial layer 405 is formed from any suitable material that can be selectively etched relative to the etch-stop layer 403, the subsequently formed support layers, and the metal ribbon layers, as described below. Preferably, the sacrificial layer 405 comprises poly-silicon that is deposited to a thickness in a range of about 0.1 to about 3.0 microns and more preferably to a thickness in a range of about 0.5 to about 1.0 microns.

Figure 4C:
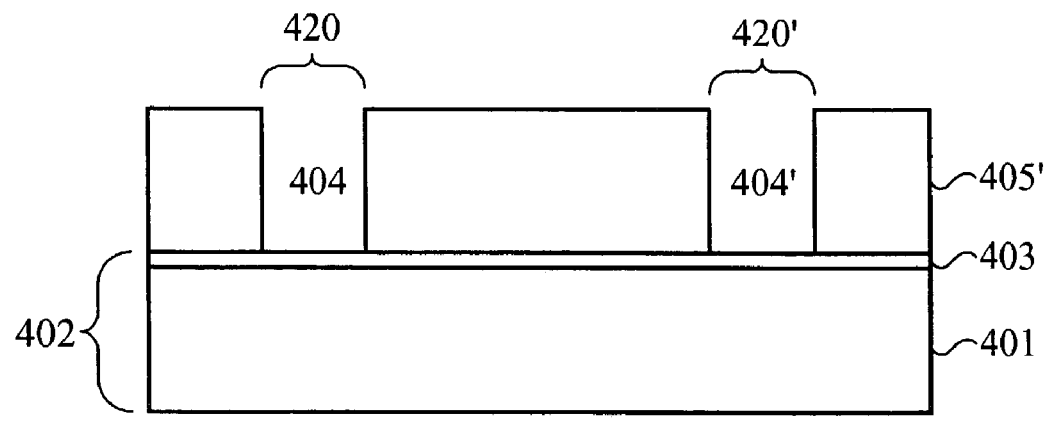
Figure 4D:
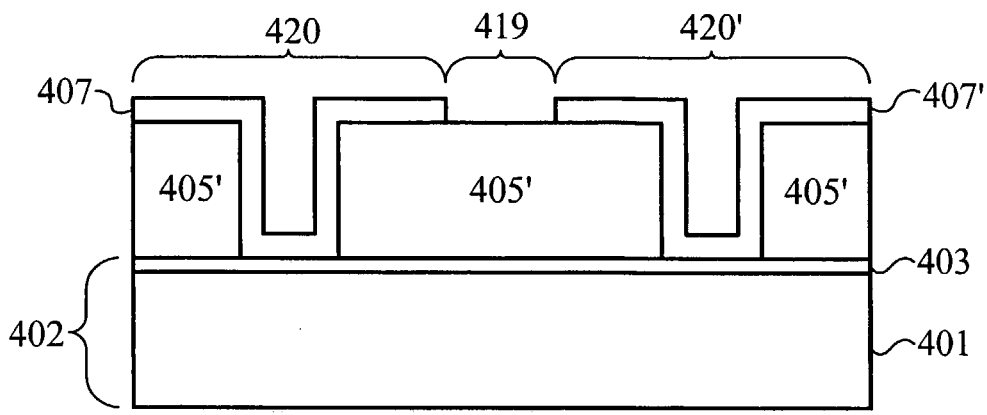

After the sacrificial layer 405 is deposited, then the sacrificial layer 405 is etched with support vias 404 and 404' to form a patterned sacrificial layer 405', as shown in FIG. 4c. The support vias 404 and 404' preferably go through the sacrificial layer 405 and expose regions of the etch-stop layer 403 therebelow. After the support vias 404 and 404' are formed, then ceramic support layers 407 and 407' are selectively formed over securing regions 420 and 420' and into the vias 404 and 404', such that a region 419 of the patterned sacrificial layer 405' remains exposed, as shown in FIG. 4d. The ceramic support layers 407 and 407' are formed from any suitable ceramic material that provide electrical insulation between a ribbon layer 410, subsequently formed, and the substrate 402. Preferably the ceramic support layers 407 and 407' are formed from silicon nitride that is deposited to a thickness in the range of about 200 to about 2000 Angstroms. The preferred thicknesses of the ceramic support layers 407 and 407' depends on the dimension of the structure being formed and the intended use.

Figure 4E:
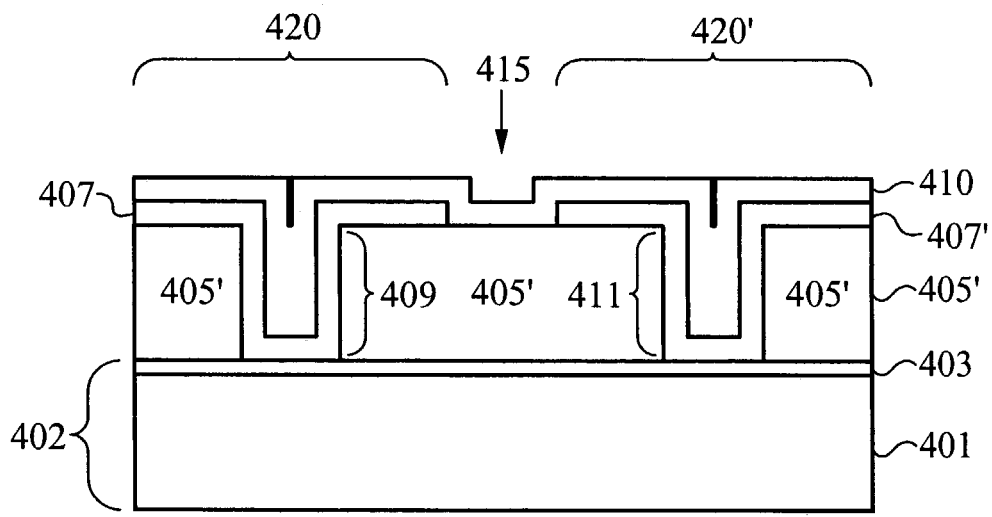

Now referring to FIG. 4e, after the ceramic support layers 407 and 407' are deposited over the securing regions 420 and 420' and into the vias 404 and 404' (FIG. 4c), then the ribbon layer 410 is formed over the region 419 (FIG. 4d) and at least portions of the ceramic layers 407 and 407'. The ribbon layer 410 is formed from any suitable metal material including metal alloy, which is capable of being deposited over the region 419 and the portions of the ceramic layers 407 and 407'. Preferably, the ribbon layer 410 is formed from aluminum that is deposited to a thickness in a range of about 200 to about 2000 Angstroms. In further embodiments, additional layers of ceramic materials and/or silicon based materials are deposited over the securing regions 420 and 420' prior to depositing the ribbon layer 410. In yet further embodiments, one or more additional metal layers are deposited over the ribbon layer 410 to provide optical properties and/or suitable structural proprieties for the application at hand.

Figure 4F:
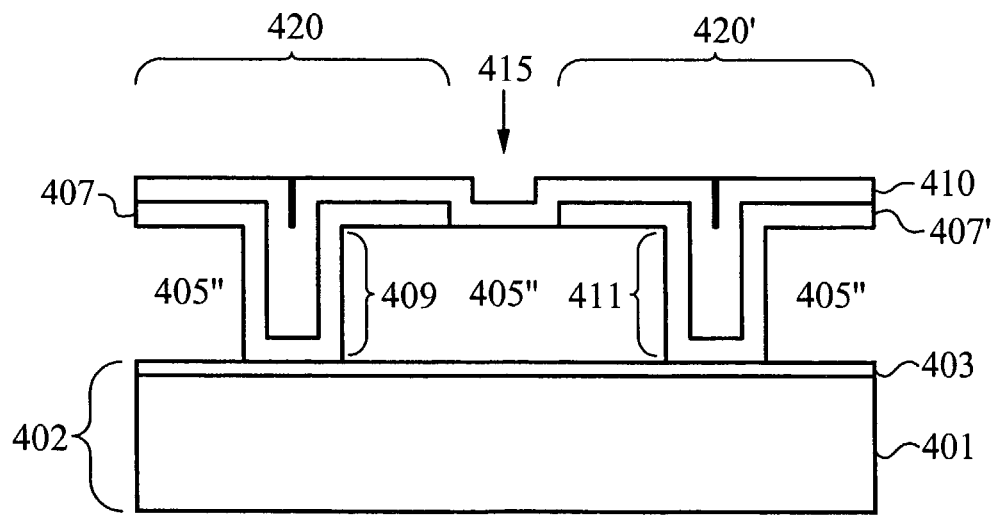

After the ribbon layer 410 is deposited, then the patterned sacrificial layer 405' is etched away to form voids 405" and release portions of the of the ceramic support layers 407 and 407', and an active region 415 of the ribbon layer 410, a shown in FIG. 4f. The ribbon layer 410 remains coupled to the substrate 402 through the support structures 409 and 411 comprising the ceramic support layers 407 and 407'. Preferably, the patterned sacrificial layer 405' is etched using a dry etc process, such as described in the U.S. patent application Ser. No. 09/952,626, entitled MICRO-ELECTRONIC MECHANICAL SYSTEM AND METHODS, filed Sep. 13, 2001, the content of which is hereby incorporated by reference. It is also preferred that the ribbon layer 410 is cut or divided into an array ribbon structures prior to etching the patterned sacrificial layer 405', whereby each ribbon structure remains coupled to the substrate 402 through a plurality of support features at or near the ends of each of the ribbons, such as described below.

Figure 5:
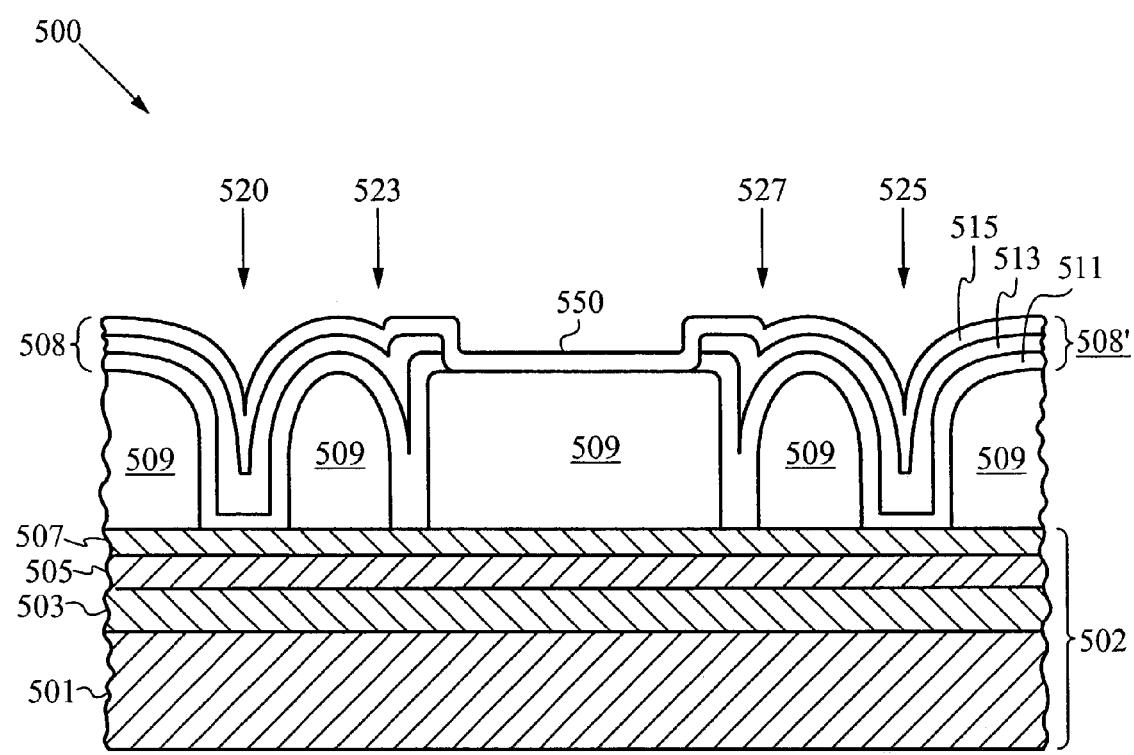
FIG. 5 shows a cross-sectional view of a micro-device with a metal ribbon supported over a substrate through multiple support structures, in accordance with the instant invention.

FIG. 5 illustrates a cross-sectional representation of a micro-device 500 comprising a multi-layer support structure 508 and 508', in accordance with a preferred construction. The micro-device 500 comprises a substrate 502, which can comprise a wafer layer 501, and silicon dioxide layers 503 and 507, with a poly-silicon layer 505 therebetween. The thicknesses of the layers 501, 503, 505, and 507 are varied depending of the application at hand. However, it is preferable that the oxide layer 507 is present to couple to the support structures 508 and 508', as previously described. The support structures 508 and 508' preferably comprise a layer of silicon nitride 511 and a metal ribbon layer 515, as previously described. In some applications, a layer of silicon dioxide 513 can be provided to improve adhesion of the metal ribbon layer 515 to the support structure 508 and 508'.

Still referring to FIG. 5, the metal ribbon layer 515 is preferably suspended over the substrate structure 502, such that there is one or more gaps 509 between the metal ribbon layer 515 and the substrate structure 502. Preferably, the metal ribbon layer 515 is supported to, or coupled to, the substrate structure 502 through a plurality of support features 520, 523, 525 and 527 positioned at each end of the metal ribbon layer 515.

FIGS. 6a–d, illustrate forming a micro-device having an array of metal ribbons, wherein the array of metal ribbons are supported over an active region 601 of substrate 602 through support regions 603 and 603'. The support regions 603 and 603' comprise one or more layers of ceramic materials and the active region 601 comprises a layer of sacrificial material, as described above.

Figure 6A:
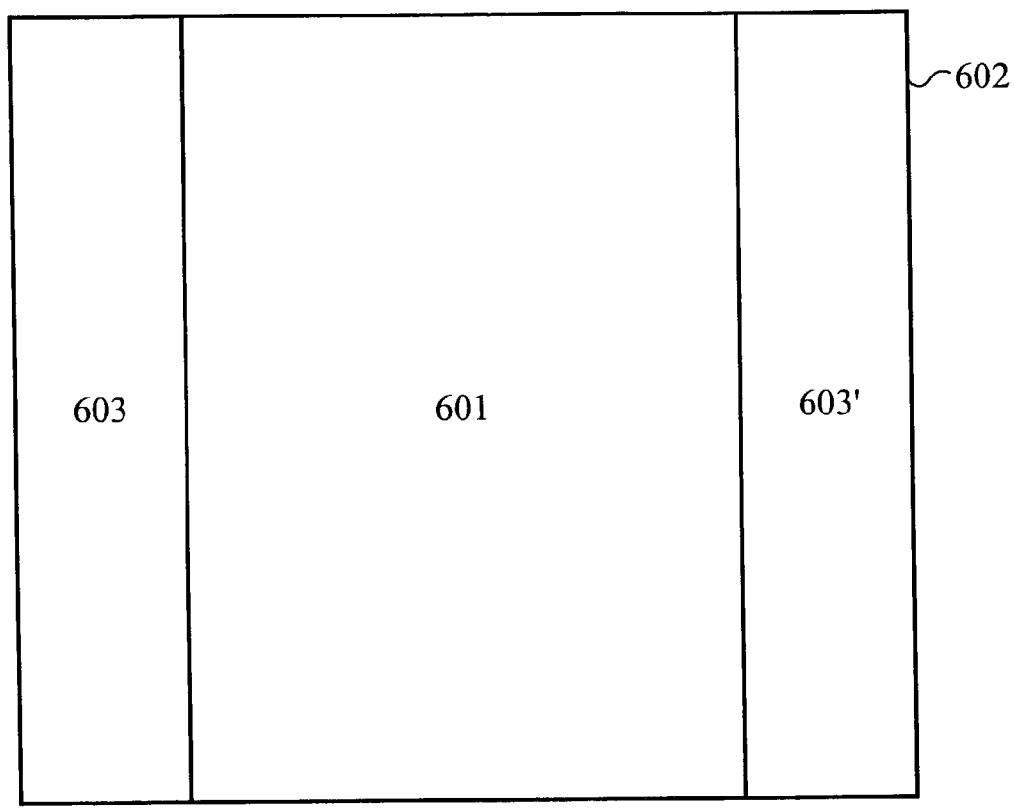
FIGS. 6*a–d* show forming a micro-device having an array of ribbons supported through support regions, in accordance with the instant invention.
Figure 6B:
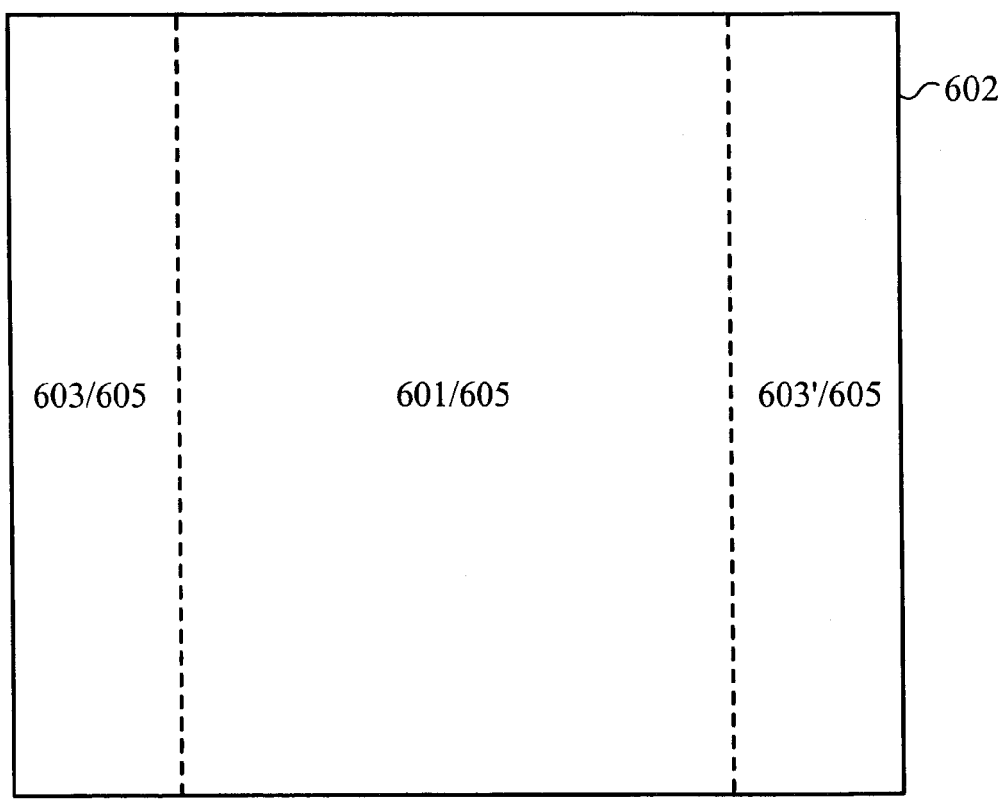
Figure 6C:
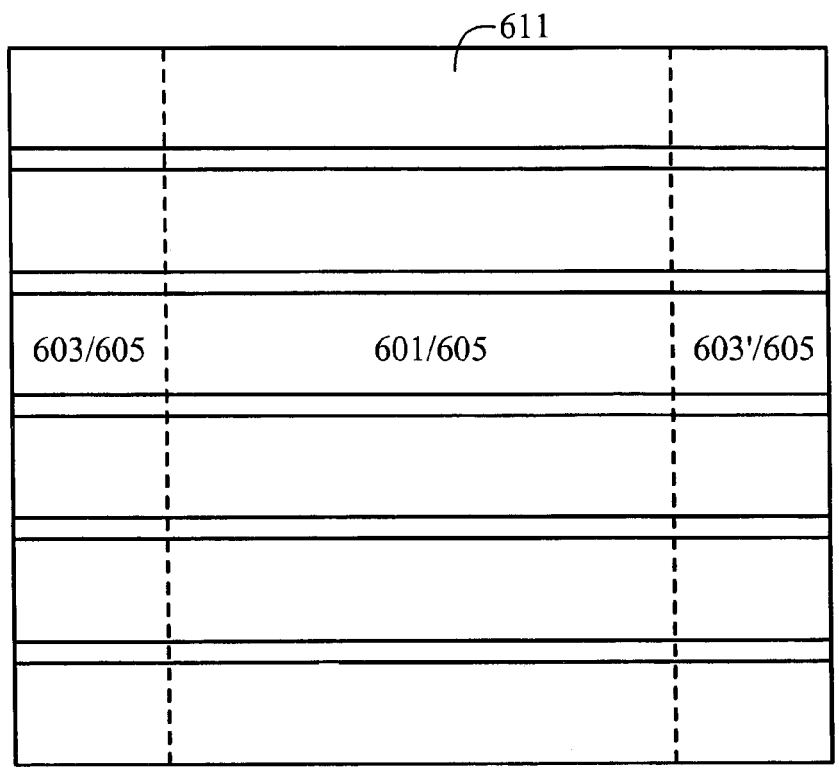

Referring now to FIG. 6b, a continuous metal layer 605 is deposited over the support regions 603 and 603' and the active portion 601. After the continuous metal layer 605 is deposited, then the continuous metal layer is cut into electrically isolated ribbons 611, as shown in FIG. 6c. The continuous metal layer 605 is formed or cut into ribbons 611 using any suitable method, but is preferably cut into ribbons 611 using a reactive ion etch process.

Figure 6D:
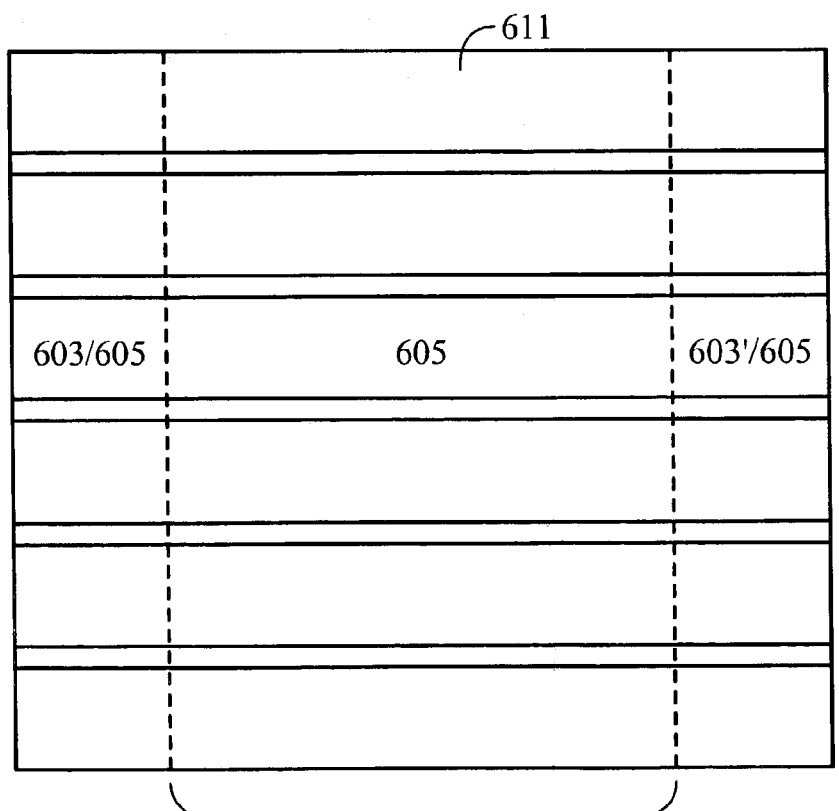

Referring now to FIG. 6d, after the continuous metal layer 605 is cut into ribbons 611, then the sacrificial layer 601 corresponding to the active region 610 is etched away to release the array of ribbons 611. Preferably, the device also has a plurality of bond pads (not shown) for coupling alternating ribbons to a driver circuit.

Figure 7:
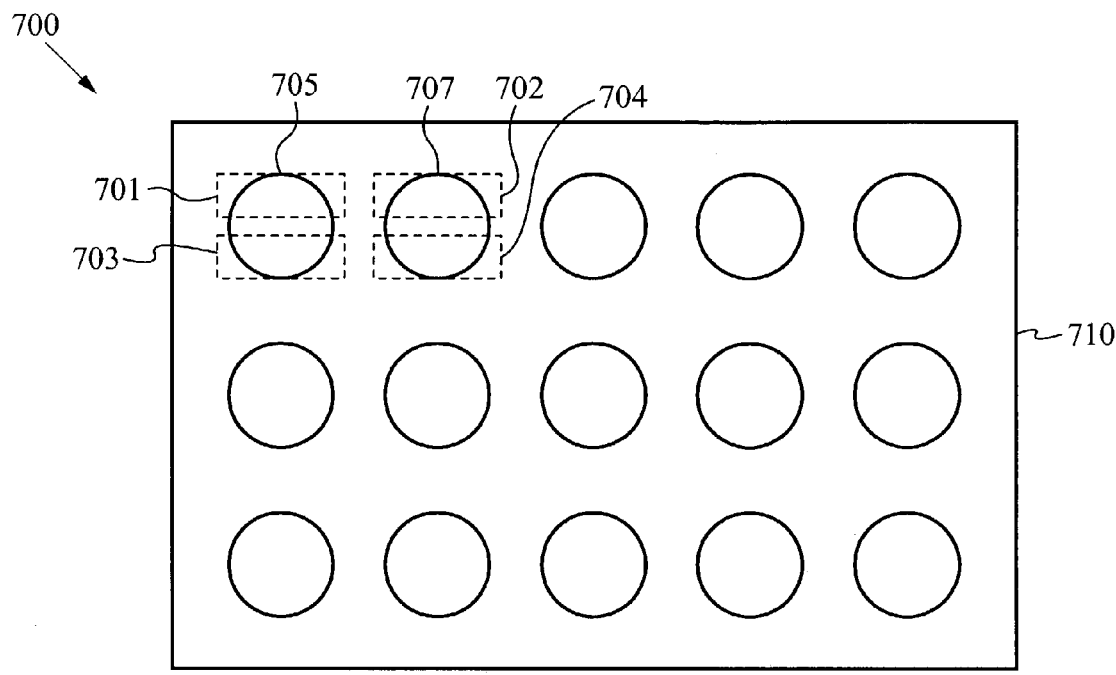
FIG. 7 shows a schematic top-view of an array of optical fibers for transmitting light to and from an optical MEM comprising metal ribbons, in accordance with the method of the invention.

FIG. 7 shows a schematic top-view of an array 700 comprising an optical fiber array 710 with optical fiber units 705 and 707 comprising one or more optical fibers. The optical fiber units 705 and 707 comprise one or more optical fibers positioned over ribbon pairs 701/703 and 702/704 for transmitting light to and from the ribbon pairs 701/703 and 702/704. The array 700 can comprise a spacer feature or binder feature for holding individual optical fiber units 705 and 707 in position and for aligning the optical fiber units 705 and 707 with the ribbon pairs 701/703 and 702/704.

Figure 8:
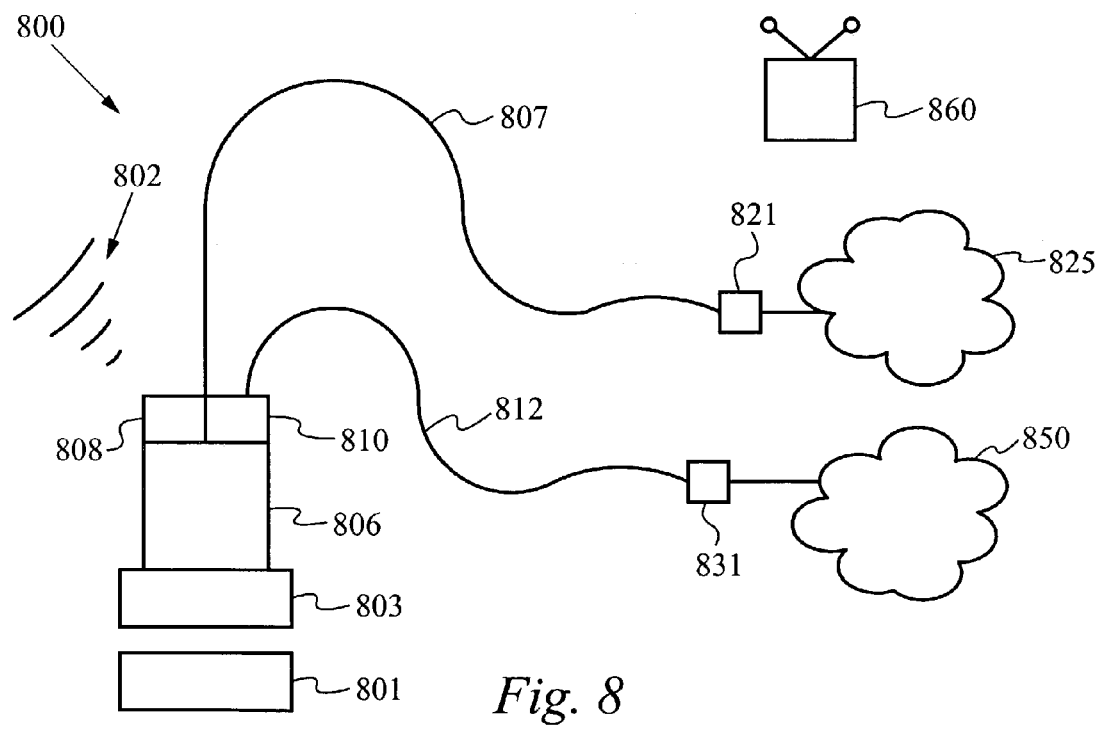
FIG. 8 shows a schematic representation of a system for optical communications using an optical MEM having metal ribbons, in accordance with the embodiments of the invention.

FIG. 8 shows a schematic representation of a system 800 for optical communications using an optical MEM device having an array of metal ribbons 801, such as described above. In accordance with the embodiments of the invention, the array of metal ribbons 801 are coupled to suitable optics 803, which can include an array of optical fiber units, as described above. The optics 803 are preferably configured to transmit light to the array of ribbons 801 and to capture and/or transmit reflected light from the array of ribbons 801, as previously explained. The system 800 also preferably comprises a transmission fiber 807 that is coupled to the optics 803 for transmitting optical signals to an outlet structure 821. The outlet structure 821 is preferably configured to couple to an optical network 825 and transmit the optical signals generated from the array of metal ribbons 801 over the network 825.

In further embodiments of the invention, the system 800 comprises a converted means 806 for converting the optical signals generated from the array 801 and/or for converting optical signals received from the network 825 into electrical signals, which may be digital.

Still referring to FIG. 8, the system 800 can be configured with a conductive transmission line 812 for transmitting and receiving electrical signals. The conductive transmission line 812 is preferably configured with a connector 810 for coupling to a network 850, such as the internet. In still further embodiments of the invention the system 800 is configured with a transmitter 808 and/or a receiver 810 for transiting and receiving wireless information.

The system 800 of the present invention is preferably configured to communicate with a compatible device (not shown). For example, a compatible device can send signals optically over the optical network 825, electrically over the internet 850 or by wireless transmission 802. The system 800 can then generate a proper response comprising optical signals which can be optically transmitted through the fiber transmission line 807 to the optical network 825, converted to electrical signals that can be transmitted electrically through the conductive transmission line 812, to the network 850, or can be converted to radio signals that are transmitted as a wireless transmission 802 from a transmitter 808 to a remote receiver 860.

Figure 9:
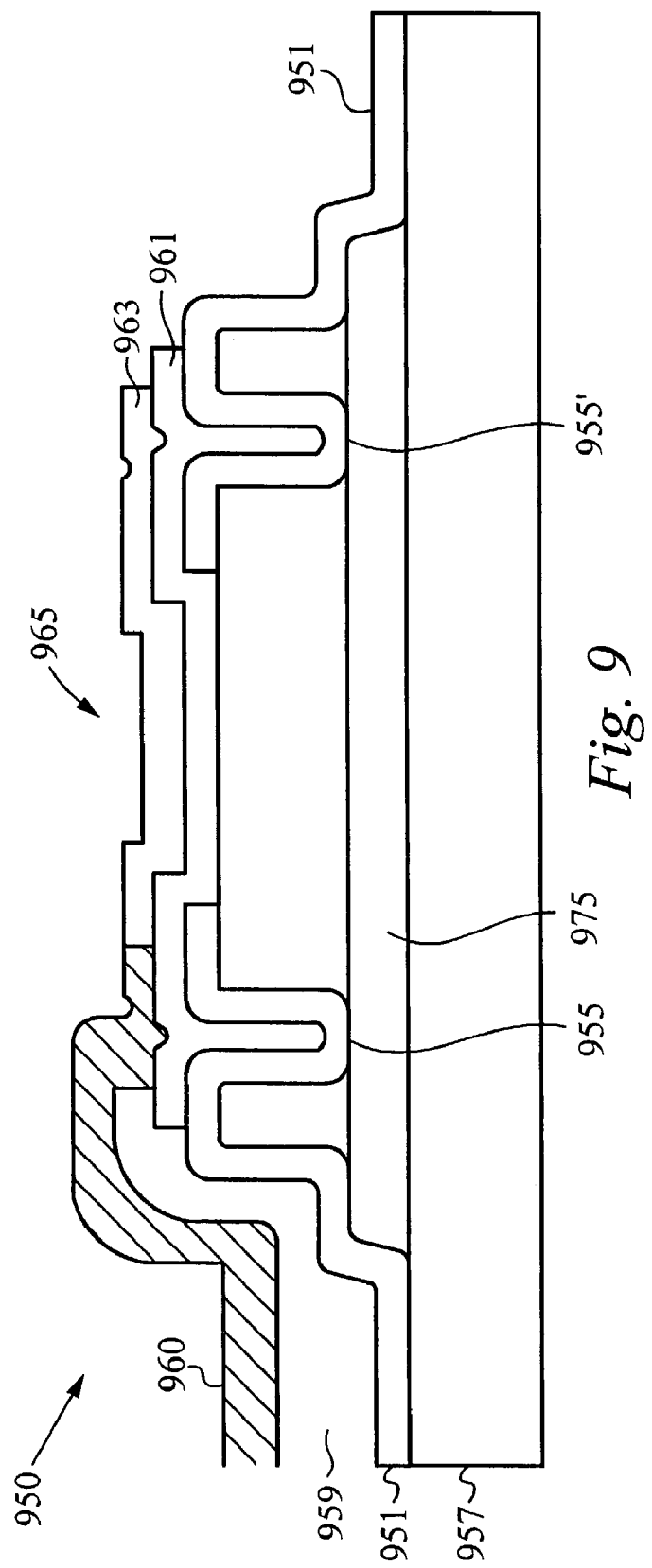
FIG. 9 is a schematic cross-sectional view of an optical MEM device having a multi-layer metal ribbon and a coupling region for coupling the ribbon to an electrical circuit, in accordance with the embodiments of the invention.

FIG. 9 shows an optical MEM device 950 with conductive layer 960 for coupling a multi-layer metal ribbon 965 to a driver circuit. The multi-layer ribbon 965 is coupled to a substrate 957 comprising a silicon dioxide layer 975 through ceramic support features 951, as described above. The device 950, in accordance with the embodiments of the invention comprises a spacer layer 959 comprising a silicon based material positioned between the conductive layer 960 and a ceramic support layer 951. Over a first metal layer 961, is a second metal layer 963 for providing the preferred optical and/or structural properties.

The invention provides an optical MEM device with an array of free metal ribbons configured for modulating light and which has applications in communications technologies. Because the active portions of the ribbons are substantially metal, charging is minimized. Further, forming metal ribbons, in accordance with the embodiments of the invention, does not require additional processing steps.

The present invention has been described in terms of specific embodiments incorporating details to facilitate the understanding of the principles of construction and operation of the invention. While the preferred micro-device of the instant invention is an optical MEM device, the invention is contemplated to be useful for making any number of micro-structure and micro-structure devices. As such, references herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A device comprising a plurality of micro-structures, each of the micro-structures comprising:

a first ceramic support structure and a second ceramic support structure that are separated by a gap over a substrate, the first ceramic support structure comprising a first extended support portion, the second ceramic support structure comprising a second extended support portion, the first and second extended support portions extending toward each other but are separated by the gap;

a metal strip spanning the gap and held over the substrate by the first ceramic structure on one end and by the second ceramic support structure on another end, the metal strip being a separate piece from the first and second ceramic support structures, the metal strip consisting of a single metal layer having a first surface configured to be impinged by incident light in a central active region and a second surface resting on surfaces of the first and second extended support portions, the metal strip being configured to deflect towards the substrate in a linear direction and relative to another metal strip to modulate the incident light.

2. The device of claim 1, wherein the first and second ceramic support structures comprise silicon nitride.

3. The device of claim 1, wherein the first and second ceramic support structures comprise anchors and posts.

4. The device of claim 1, wherein the substrate comprises silicon with an oxide layer, wherein the oxide layer is coupled to the first and second ceramic support structures.

5. The device of claim 1, wherein the metal strip comprises a ribbon having a length in a range of about 50 to about 500 microns and a width in a range of about 4.0 to about 40 microns.

6. The device of claim 1, wherein the metal strip comprises an aluminum layer in a range of about 250 to about 2000 Angstroms thick.

7. An optical MEM device comprising:
a. means for generating light;
b. means for modulating the light comprising a plurality of reflective metal ribbons suspended over a substrate by ceramic support structures at opposing ends of the metal ribbons, the metal ribbons being configured to deflect in a linear direction towards the substrate to modulate the light and generate modulated light, each of the metal ribbons having a first surface configured to directly receive the light and a second surface supported by extended portions of the ceramic support structures; and
c. means for transmitting the modulated light.

8. The optical MEM device of claim 7, wherein a first set of the metal ribbons is configured to move relative to a second set of the metal ribbons to modulate the light.

9. The optical MEM device of claim 7, wherein the ceramic support structures comprise silicon nitride.

10. The optical MEM device of claim 7, wherein the ceramic support structures comprise a plurality of anchor features and a plurality of post features.

11. The optical MEM device of claim 7, wherein the metal ribbons are formed from aluminum in a range of about 250 to about 2000 Angstroms thick.

12. The optical MEM device of claim 7, wherein the metal ribbons are in a range of about 50 to about 500 microns long and in a range of about 4.0 to about 40 microns wide.

13. The optical MEM device of claim 7, wherein the light has one or more wavelengths in a range of about 300 to about 3000 nanometers.

14. The optical MEM device of claim 7, wherein the means for transmitting the light comprises one or more optical fibers.

* * * * *